Oct. 21, 1952 V. BURKARD ET AL 2,614,308
BLOCK MOLDING MACHINE
Filed April 20, 1949 4 Sheets-Sheet 1

INVENTORS
VICTOR BURKARD
AND DONALD J. SHEPHERD
BY Vance E. Hoffman
ATTORNEY

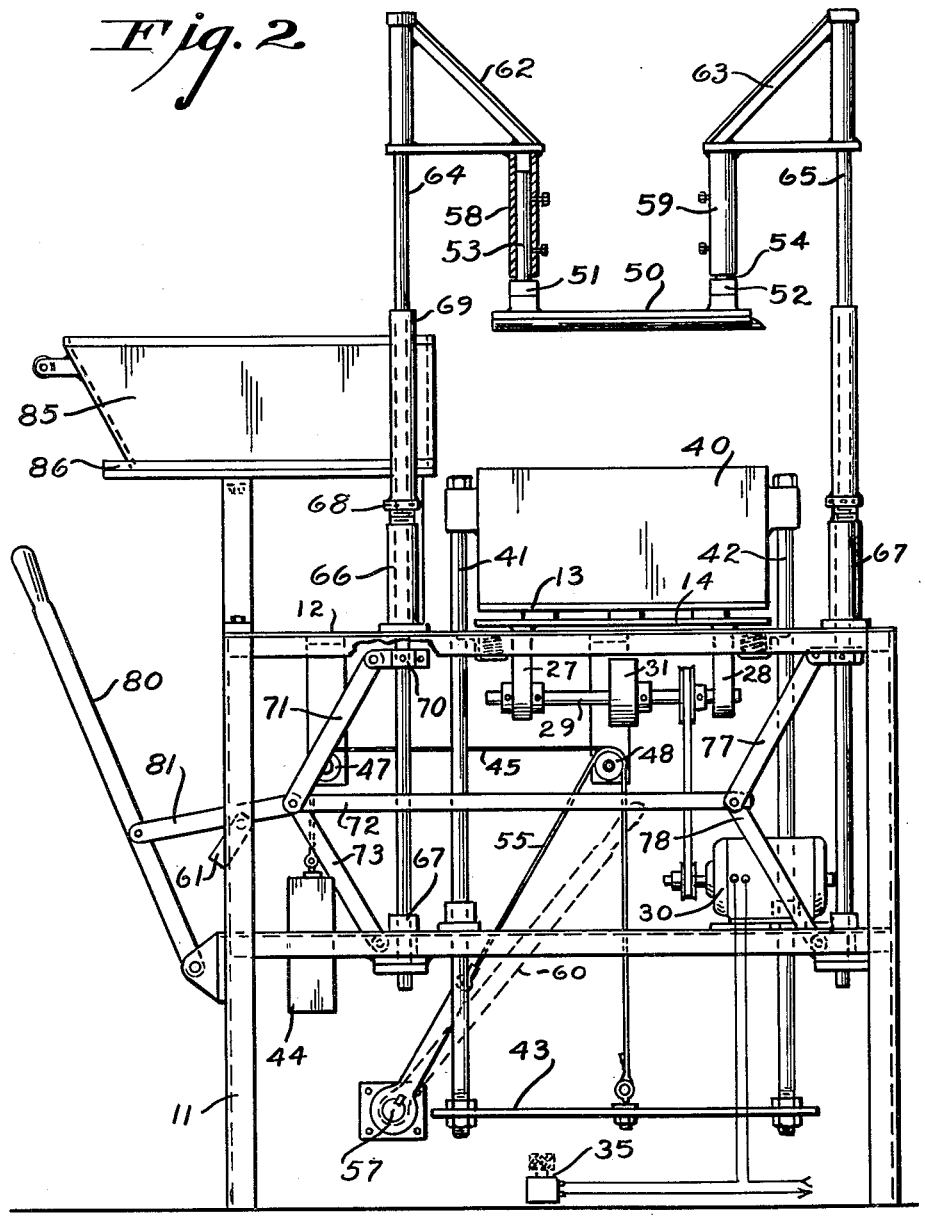

Oct. 21, 1952 V. BURKARD ET AL 2,614,308
BLOCK MOLDING MACHINE
Filed April 20, 1949 4 Sheets-Sheet 3
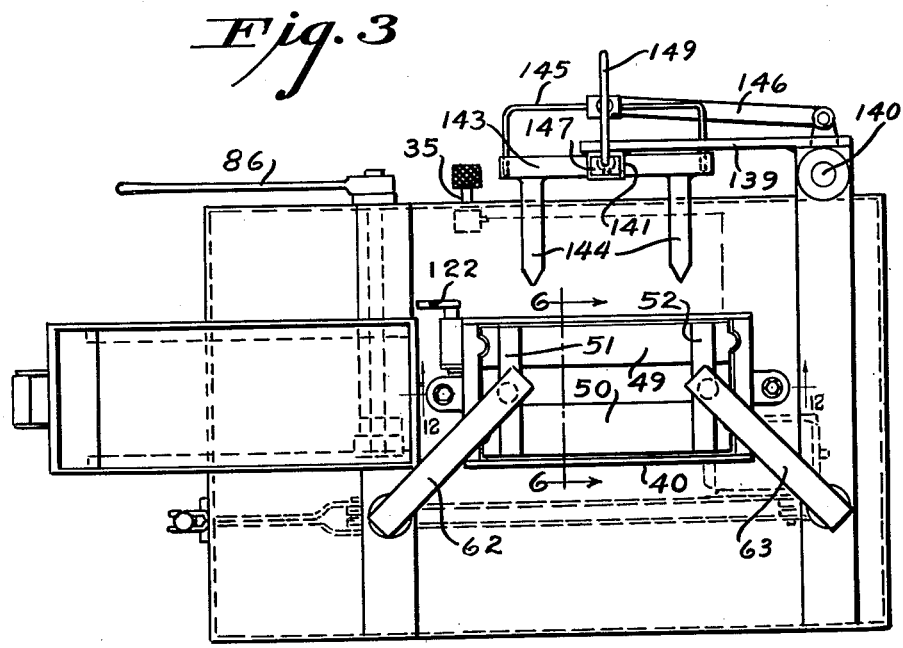
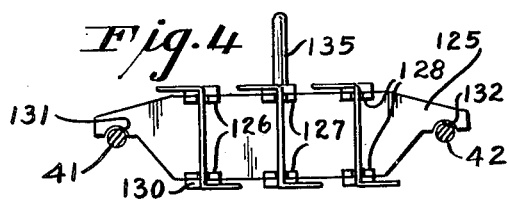
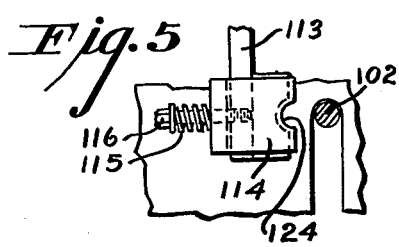
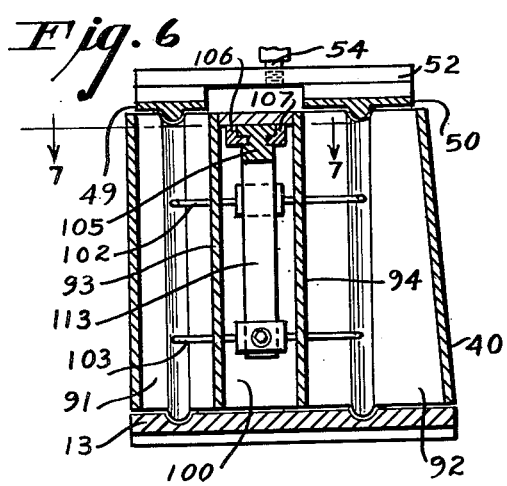
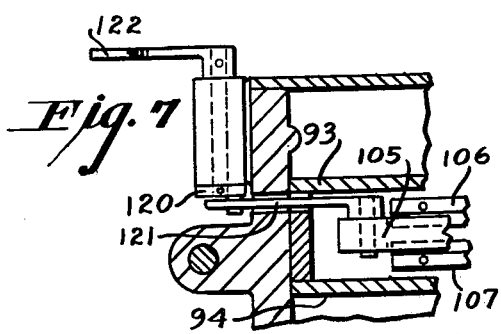
INVENTORS
VICTOR BURKARD
AND DONALD J. SHEPHERD
BY Vance E. Hoffman
ATTORNEY Oct. 21, 1952     V. BURKARD ET AL     2,614,308
BLOCK MOLDING MACHINE
Filed April 20, 1949                             4 Sheets-Sheet 4
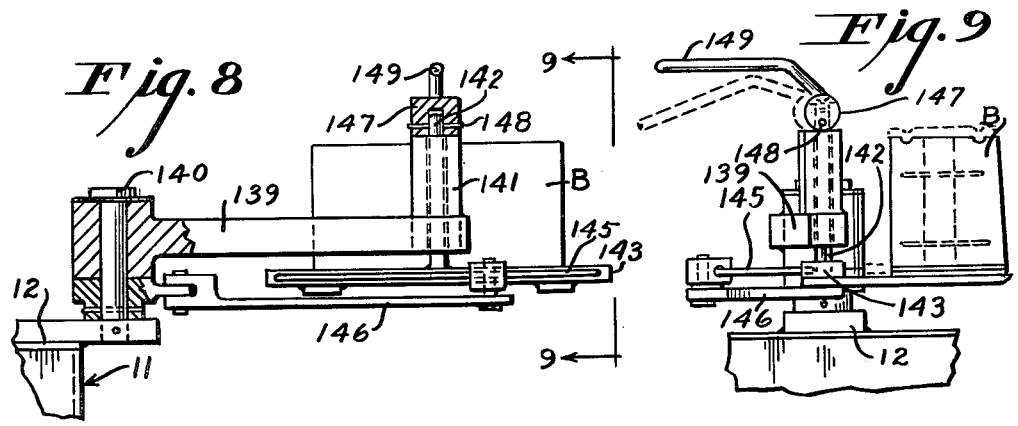
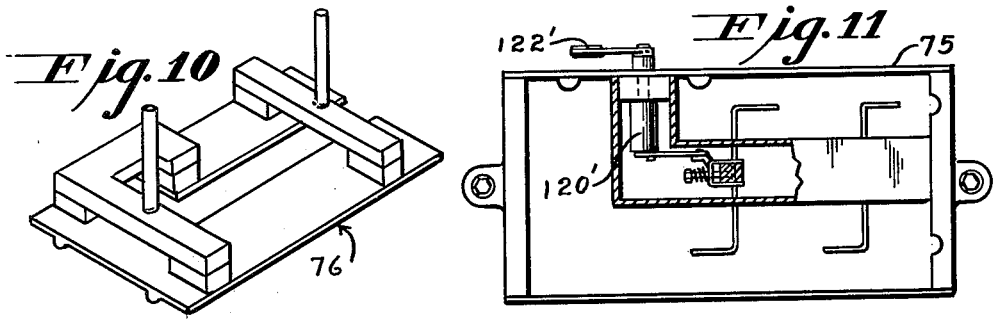
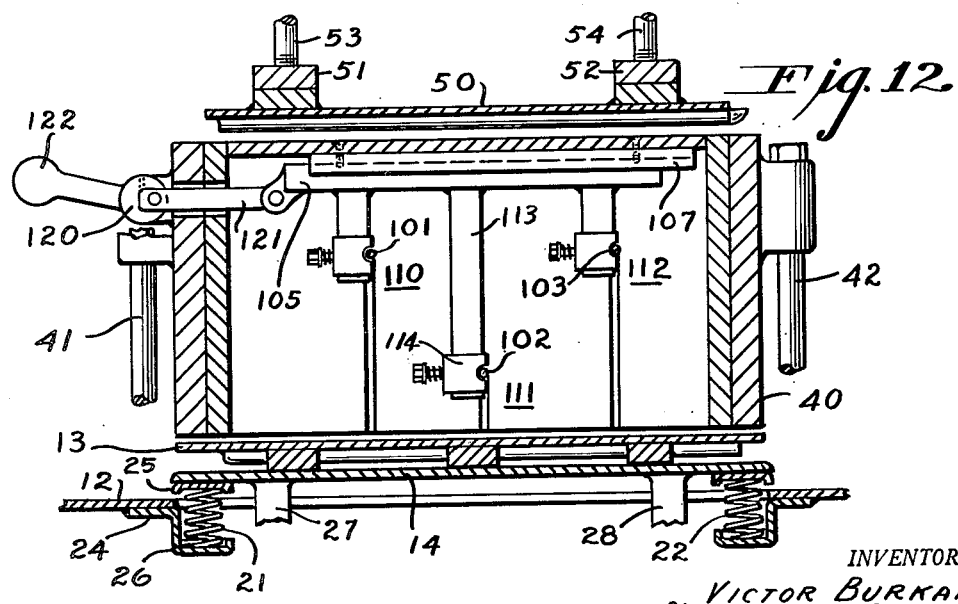
INVENTORS
VICTOR BURKARD
AND DONALD J. SHEPHERD
BY Vance E. Hoffman
ATTORNEY Patented Oct. 21, 1952

2,614,308

UNITED STATES PATENT OFFICE 2,614,308

BLOCK MOLDING MACHINE

Victor Burkard, Barton, and Donald J. Shepherd, Buffalo, N. Y.; said Shepherd assignor to said Burkard Application April 20, 1949, Serial No. 88,502

3 Claims. (Cl. 25—41)

1

The present invention relates to construction block molding equipment and, particularly, to a form of mold equipment suitable for the manufacture of concrete blocks and the like, of a design wherein each block comprises inner and outer panels connected to one another solely by reinforcing ties, usually comprising metal rods or the like.

The prime object of the invention is a simple and practicable form of blockmaking system suitable for manufacture of blocks of the foregoing character.

Other objects and features of the invention will become apparent from a further perusal of the specification and the accompanying drawings forming a part thereof.

In the drawing Fig. 1 is a rear elevational view of a machine embodying the invention, showing the mold head and mold in their elevated position with part of a mold wall broken away, and with a tie-rod support assembly with the rods thereon in readiness for being raised into the mold.

Fig. 2 is a view similar to Fig. 1, but with the mold lowered onto a pallet in readiness to receive mold charges and with the head slightly lowered.

Fig. 3 is a plan view of the machine.

Fig. 4 is a plan view of a tie-rod support assembly with tie rods arranged thereon and the support arranged against the mold elevating rods.

Fig. 5 is an enlarged view of a fragment of the mold assembly, illustrating one of the tie-rod holding devices before engagement with a rod.

Fig. 6 is an enlarged sectional elevation taken on line 6—6 of Fig. 3.

Fig. 7 is a fragment of the mold on line 7—7 of Fig. 6.

Fig. 8 is an enlarged view in elevation of a fragment of the machine embodying the block take-out mechanism with certain parts broken away, showing the take-out mechanism swung clear of the machine top 12 and with a block B shown thereon.

Fig. 9 is a view of the parts shown in Fig. 8 as seen when looking in the direction of arrows 9—9, Fig. 8.

Fig. 10 is a perspective view of a head assembly used in the formation of corner blocks.

Fig. 11 is a top plan view of a mold assembly, used in the formation of corner blocks, with parts broken away.

Fig. 12 is a sectional view taken on line 12—12 of Fig. 3.

Figures 1, 1A:
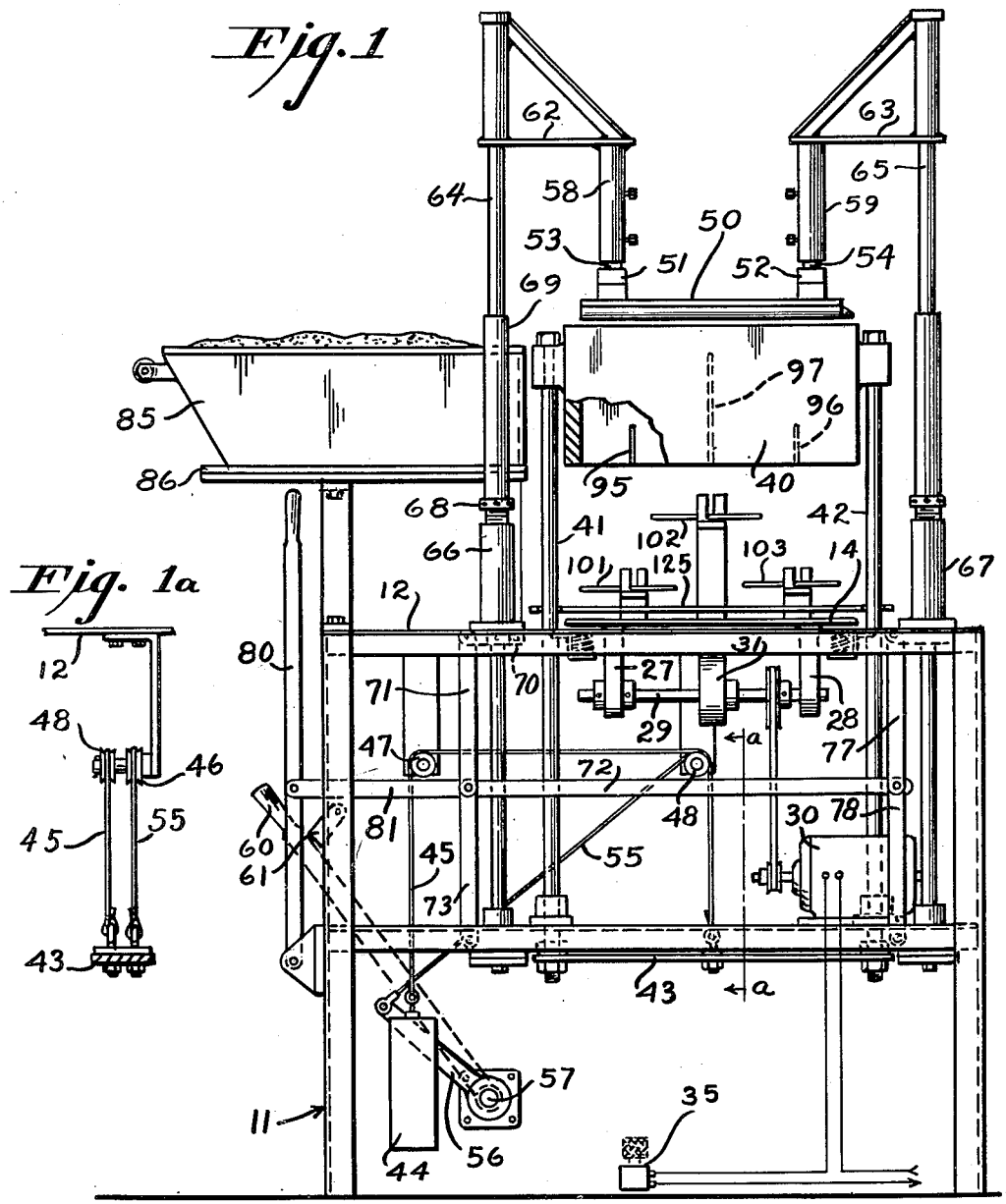
Fig. 1a is a fragmentary view on line a—a of Fig. 1.

Referring in detail to the drawings, the machine parts are grouped about a main frame or support 11 having a top 12. The top 12 has a rectangular opening above which is arranged a

2 pallet support 14 (Figs. 1 and 12) which rests on springs, such as springs 21 and 22, at its four respective corners. Each of the springs 21 and 22, and the others (not shown) at its top is surrounded by a cup, such as cup 25, on the underside of support 14, and has its bottom end surrounded by a similar cup 26 projecting from a supporting bracket, such as bracket 24, secured to the underside of top 12. Depending from pallet support 14 are bearing supports 27 and 28 of a mechanical vibrator comprising a shaft 29 (Figs. 1 and 2) adapted for rotation by a motor 30. Shaft 29 is unbalanced by an eccentrically mounted weight 31 which causes the shaft 29 and pallet support 14 to vibrate. A foot switch 35 provides a ready means of closing the circuit of motor 30 at will.

A wall mold 40 is carried by rods 41 and 42 passing through suitable bearings in frame 11, and at their bottom ends bridged by a supporting member 43. For ease of operation, the combined weight of mold 40, rods 41 and 42, and member 43 are almost counterbalanced by a weight 44 attached to one end of a cable 45 which passes over pulleys 46 (Fig. 1a) and 47 (Figs. 1 and 2) and has its other end attached to member 43. Raising the mold 40 is effected by means of a cable 55 passing over a pulley 48 and having one end secured to member 43 and the other end attached to the free end of an arm 56 carried by a shaft 57, adapted to be turned by an operating arm 60 attached to shaft 57 and adapted to be held in the position shown by a stop 61 over which the operator springs arm 60.

A mold head assembly includes separate head units 49 and 50 (Figs. 3 and 6) bridged by supporting bars 51 and 52 (Figs. 1-3 and 6) from which extend posts 53 and 54 projected into sockets 58 and 59 of brackets 62 and 63 secured to the top ends of vertical rods 64 and 65 passing through suitable bearings, such as bearings 66 and 67 carried by frame 11. Each bearing, such as 66, has threaded into it a bushing 68 attached to a sleeve 69 which is engaged by bracket 62 to stop the downward movement of head assembly in the desired position with respect to mold 40. Rod 64 intermediate its ends passes through a clamp 70 carried on one end of a toggle member 71, the other end of which is pivotally connected to an actuating bar 72, to one end of a member 73 similar to 71, and to one end of a link 81. The opposite end of member 73 is pivotally connected to frame 11. Rod 65 is supported in like fashion by members 77 and 78 pivotally attached to the other end of the actuating bar 72. The other end of link 81 is connected to a hand lever 80. By movement of lever 80 to the position shown in Fig. 1, the pivots of members 71, 73, and 77, and 78 are brought into a vertical alignment, thus bringing the mold head assembly to its uppermost position. The head assembly may of course be lowered by swinging lever 80 leftward.

A hopper 85 supported on a track 86 is slidable into vertical register with the mold to charge the same by gravity through suitable openings in the bottom of the hopper.

The wall mold 40 is divided into separate panel mold compartments 91 and 92 (Fig. 6) by inner walls 93 and 94, each provided with slots, such as slots 95, 96, and 97 (Fig. 1), to accommodate tie rods, such as, for example, the rods 101, 102, and 103 (see Figs. 1, 4, 5, 6, and 12). Walls 93 and 94, and the chamber 100 therebetween, may be said to constitute the core of the mold. Arranged within chamber 100 is a tie-rod clamping mechanism including a member 105 slidably arranged between rails 106 and 107. Member 105 has upright branches comprising part of assemblies 110, 111, and 112 for clamping tie rods, such as rods 101, 102, and 103, for example, against the portions of mold 40 bounding slots 95, 96, and 97 occupied by such rods.

The clamping assemblies are similar to one another and therefore a description of one will suffice. Assembly 111 (Figs. 5 and 12) includes the upright branch 113 having a U clip 114 arranged thereabout resiliently held in place by a spring 115 surrounding a cap screw 116 passing through an aperture in clip 114 and threaded into member 113. The open ends of clip 114 are grooved as at 124 to partly encircle a tie rod, such as rod 102, to be engaged thereby. A link 121 (Figs. 7 and 12) couples member 105 to an eccentric 120 adapted to be turned by a lever 122 to bring the clamping assemblies from the position in which assembly 111 is shown in Fig. 5 to the position in which the assemblies 110, 111, and 112 are shown in Fig. 12 into engagement with rods such as rods 101, 102, and 103 occupying the slots in mold 40 thus resiliently holding such rods against the portions of the mold walls bounding slots 95, 96, and 97.

The tie rods, such as rods 101, 102, and 103, are positioned within the mold 40 by the assistance of a tie-rod support 125 (Figs. 1 and 4) having a suitable handle 135. This support is provided with pairs of upright members 126, 127, and 128 (Fig. 4) channeled to receive the rods and each having a transverse member, such as member 130, for holding the end portions of the rods in a horizontal plane. Support 125 is provided with grooves 131 and 132 adapted to engage about mold support rods 41 and 42, as illustrated in Figs. 1 and 4. With the support 125 in the position shown, rods thereon are in vertical register with the slots 95, 96, and 97, so that an operator can readily seize handle 135 and elevate the support until the rods occupy the closed ends of the slots. Lever 122 may then be moved to clamp the rods in the mold after which the support 125 is removed and a pallet 13 arranged on the pallet support 14.

The corner mold 75 (Fig. 11) contains clamping assemblies similar to those used in the wall mold, the main difference being that the eccentric member 120' thereof is inside the mold core and has its handle 122' located along the side rather than at the end thereof. A suitable corner mold pallet (not shown) and a head assembly, such as the assembly 76 (Fig. 10), are used with the corner mold. Obviously, mold 75 and the head assembly 76 are interchangeable with mold 50 and its head assembly.

To remove a formed block and its supporting pallet from pallet support 14, a block take-out arm 139 is hinged on a vertical pin 140. The free end of arm 139 (Fig. 8) and an upstanding extension 141 thereof have a vertical passage through which extends a shaft 142. The lower end of shaft 142 is secured to a horizontal bar 143 (Figs. 3, 8 and 9) provided with bayonet members 144 for introduction between a pallet 13 and pallet support 14. Bar 143 is further provided at its rear with a bale 145 to which is pivotally connected one end of a link 146 whose other end is pivotally connected at a point near pin 140, thus better enabling bar 143 to be moved along a substantially straight line path to position members 144 under a pallet. The upper end of shaft 142 is eccentrically anchored to a cam 147 by a pivot pin 148. Integral with cam 146 is a handle 149 which can be depressed to lift the pallet off pallet support 14. In the lifted position bar 143 holds the mold pallet clear of the pallet support so that the pallet, with a block thereon, can be moved clear of its position of formation.

*Operation*

The operation is as follows: With the mold 40 in its up position, as shown in Fig. 1, the handle 135 of the rod support 125 is seized and elevated to position the tie rods 101—103 in the mold. Lever 122 is then operated to lock the tie rods in position and support 125 withdrawn. Placement of a pallet 13 on pallet support 14 may either precede or follow the tie rod inserting operation, as preferred by the operator.

With a pallet and the tie rods in place, the operator seizes lever 60, springs it clear of stop 61, and permits the mold 40 to be lowered onto pallet 13. The hopper 85 is then shifted over the mold to charge the same, and is then returned to its initial position. The operator can, at this stage or later, as desired, restore lever 122 to transfer support of the tie rods to the charges. Also, the operator may, before return of the hopper, assist the charging if desirable by momentarily stepping on foot pedal 35 to set the vibrator into action.

After return of the hopper 85 to its initial position, lever 60 is shifted to permit the mold head units 49 and 50 to rest on the top of the mold charges. If lever 122 was not previously restored, it is restored at this time, since rods 101—103 will be sustained in position by the mold charges. Foot switch 35 is now actuated until the charges are compacted to the extent necessary to bring the head bracket 62 and 63 into engagement with their tubular stops.

To remove the block from mold 40, arm 60 is returned to its initial position. During the beginning of this movement the head, owing to its weight, remains stationary and functions to hold the block on the pallet. The block is thus broken away from the mold walls before any movement of the head is effected. After slight upward movement, the core of mold 40 engages the head member bars 51 and 52 and thus lifts the head assembly with it. If desired, a second operator can take over the head-lifting operation by means of lever 80 after the mold has been lifted sufficiently to break the block from the mold, although it is possible to fully restore the head by means of lever 60.

Corner blocks are made in the same fashion as are wall blocks, it being merely necessary to change the mold head and mold assembly and to use a pallet (not shown) appropriate for corner blocks. A modified support (not shown), similar to support 125, is also employed in installing the rods in the corner block.

What is claimed is:

1. In a concrete blockmaking apparatus, a mold having two laterally spaced panel-forming compartments and having opposed walls slotted for the receipt of tie members whose ends are to be embedded in panels cast in said compartments, tie-engaging means for locking tie members passing through said slotted walls in fixed relation to said mold, and means for thereafter loading and compacting charging of concrete in said mold chambers and about such portions of the tie members as are arranged therein, said tie-engaging means being operable at will to free the tie members and formed panels for removal as a unit from said mold.

2. In a concrete blockmaking apparatus such as defined by claim 1 in which the charge-compacting means includes a mold-closing member, with associated means for lowering it into engagement with the top surface of mold charges within the mold, means for raising the mold relative to said member a limited distance and for thereafter lifting said member and mold clear of the cast block.

3. In a blockmaking machine, a mold pallet support, a mold side wall and core assembly aligned over said support, support means for said assembly, means for lowering said assembly onto said support and for raising it therefrom at will, the core of said assembly having a passage therein through which a reinforcing element may be extended into areas bounded by said side wall, and means for locking such element to the core until after mold material has been introduced therein.

VICTOR BURKARD.
DONALD J. SHEPHERD.

REFERENCES CITED

The following references are of record in the file of this patent:

UNITED STATES PATENTS

| Number | Name | Date |
|---|---|---|
| 782,230 | Finger | Feb. 14, 1905 |
| 1,448,911 | Bruckner | Mar. 20, 1923 |
| 2,359,214 | George | Sept. 26, 1944 |
| 2,492,415 | Coates et al. | Dec. 27, 1949 |